United States Patent [19]
Mabuchi et al.

[11] 4,112,201
[45] Sep. 5, 1978

[54] POWER SOURCE UNIT

[75] Inventors: Kenichi Mabuchi; Kogiro Komatsu, both of Tokyo, Japan

[73] Assignee: Mabuchi Motor Co., Ltd., Tokyo, Japan

[21] Appl. No.: 787,088

[22] Filed: Apr. 13, 1977

[30] Foreign Application Priority Data

Apr. 19, 1976 [JP] Japan .................................. 51-44227

[51] Int. Cl.² .......................................... H01M 10/50
[52] U.S. Cl. .................................................... 429/62
[58] Field of Search ................... 429/62, 99, 90, 92, 429/61; 320/36, 47, 51, 52, 49

[56] References Cited
U.S. PATENT DOCUMENTS

| 3,518,524 | 6/1970 | Roszyk | 320/36 X |
| 3,579,076 | 5/1971 | Herbst et al. | 320/36 |
| 3,622,397 | 11/1971 | Belove | 429/62 X |
| 3,956,019 | 5/1976 | Mabuchi et al. | 429/99 |
| 4,035,552 | 7/1977 | Epstein | 429/62 X |

Primary Examiner—Anthony Skapars

[57] ABSTRACT

A power source unit in which a plurality of rapidly chargeable and dischargeable batteries having low internal resistance are connected in series to form an integral battery assembly, characterized in that a thermal responsive device is incorporated in the power supply unit, and an electric current flowing in the batteries is limited by changes in the state of the thermal responsive device when the temperature in the batteries of the unit is increased.

9 Claims, 4 Drawing Figures

POWER SOURCE UNIT

BACKGROUND OF THE INVENTION

1. Field of the Invention

This invention relates to a power source unit in which a plurality of rapidly chargeable and dischargeable batteries having low internal resistance are connected in series, and an electric current flowing in the batteries is automatically limited when the temperature in the batteries of the unit is increased.

2. Description of the Prior Art

There has been developed in recent years a power source unit in which a plurality of rapidly chargeable and dischargeable batteries having low internal resistance for example, nickel-cadmium batteries are connected in series and assembled and packed with insulating materials to form an integral battery assembly. The power source unit has low internal resistance and can be charged with a high charging current considering its small volume and can discharge a high discharging current. Moreover, the power unit can be charged normally in a few minutes. These advantages, therefore, are made full use of in various electric-operated toys, for example, radio-controlled airplanes.

However, when charging or discharging the power source unit, an extremely large current may sometimes flow in the power source unit. In such a case, the temperature of the batteries is unwantedly increased, and along with this, the internal pressure of the batteries is also increased. To cope with this problem, various measures, such as a safety valve, have been devised to prevent an increase in the internal pressure of the batteries. In the case of a safety valve, however, gas in the batteries is released to the outside as the safety valve is operated, resulting in a deterioration in the performance of the batteries or reduction in the life of the batteries.

SUMMARY OF THE INVENTION

It is an object of the present invention to provide a power source unit in which the above described disadvantages are eliminated.

It is another object of the present invention to provide a power source unit which permits an extremely large charging or discharging current to flow without deterioration of the performance of the batteries or reduction of the life of the batteries.

It is still another object of the present invention to provide a power source unit which, when the temperature of the batteries is increased to a predetermined level, is capable of controlling an increase in the internal pressure of the batteries due to the temperature rise by limiting an electric current flowing in the batteries.

Figure 1:
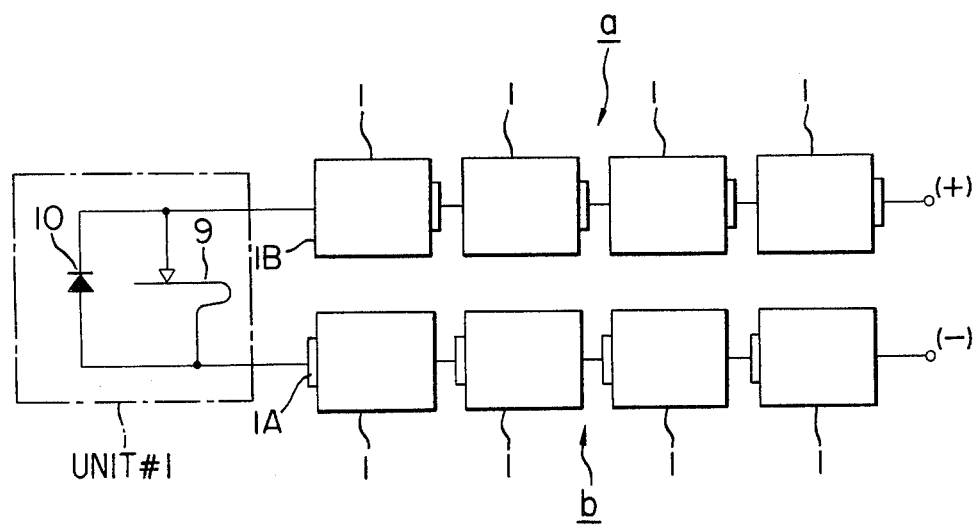
FIG. 1 is a schematic illustration of a power source unit embodying this invention.

DETAILED DESCRIPTION OF THE PREFERRED EMBODIMENTS:

In FIG. 1, numeral 1 refers to a rapidly chargeable/-dischargeable battery having low internal resistance, for example, a nickel-cadmium battery, 9 to a thermal responsive circuit element, for example, a thermal responsive switch, 10 to a nonlinear circuit element whose resistance varies either in forward direction or in backward direction, Unit #1 to a thermal responsive device, $a$ to a battery train arranged at the upper part of the figure and $b$ to a battery train arranged at the lower part of the figure. A plurality of the batteries are connected in series, and these batteries 1 are, as will be described later, assembled and packed with insulating materials to form an integral battery unit.

When the nickel-cadmium batteries 1 are charged, charging current flows from (+) terminal to terminal (−) via a battery train $a$, a thermal responsive switch 9 and a battery train $b$. When the temperature of the batteries 1 is increased to a predetermined level due to an extremely large charging current, the thermal responsive switch 9 opens its contact to interrupt the charging current. As a result, the temperature of the batteries 1 decreases, and when the temperature falls to less than the predetermined level, the thermal responsive switch 9 is turned on to start charging again. On the other hand, when the nickel-cadmium batteries 1 are discharged, discharge current flows from (−) terminal to an external load (not shown) via the battery train $b$, the diode 10 or the thermal responsive switch 9, the battery train $a$ and the (+) terminal. When the temperature of the batteries 1 is increased to a predetermined level due to an extremely large discharging current, the thermal responsive switch 9 opens its contact. However, the discharging current continues to flow via the diode 10 even after the thermal responsive switch 9 is turned off. The discharging current after the thermal responsive switch 9 is turned off is maintained at a certain level, though decreased slightly by the resistance of the diode 10. This decreased current is used, for example, as a protective current for operating a protective device in the load (not shown). For example, when the power source unit of the present invention is used as a power source for an electric motor driven, radio controlled model airplane, the above-mentioned protective current, though insufficient for driving the electric motor, is sufficient for operating the radio control unit (not shown). Thus, even if the thermal responsive switch 9 is turned off and sufficient current is not supplied to the electric motor, radio control is operated by the above-mentioned protective current to recover the model airplane safely.

Figure 2:
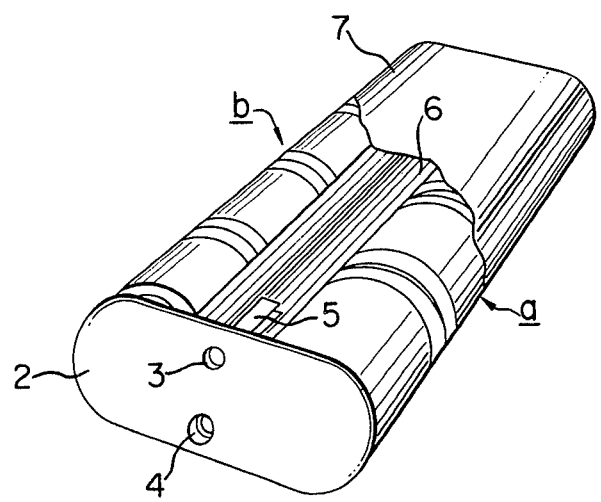
FIG. 2 is a perspective view of a power source unit embodying this invention with a portion being cut away.
Figure 3:
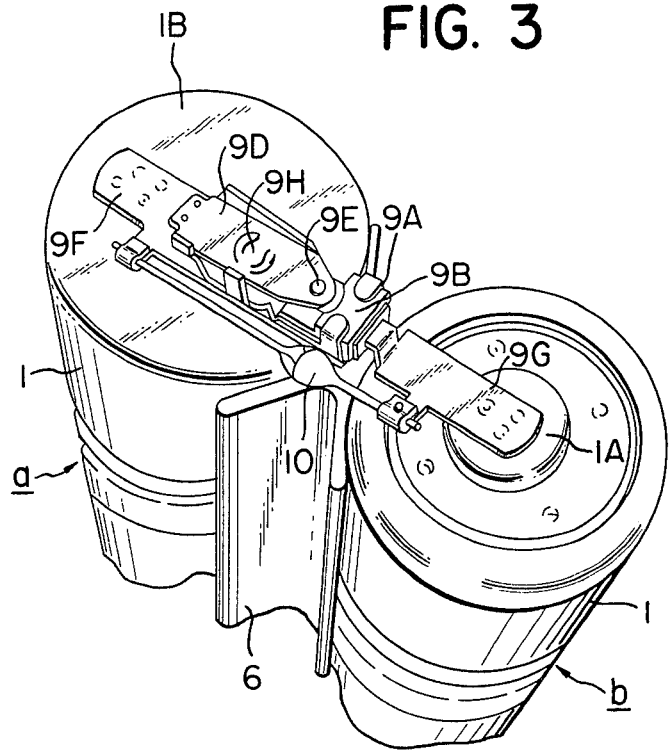
FIG. 3 is a perspective view showing major part of a power source unit embodying this invention with its cover being removed therefrom.
Figure 4:
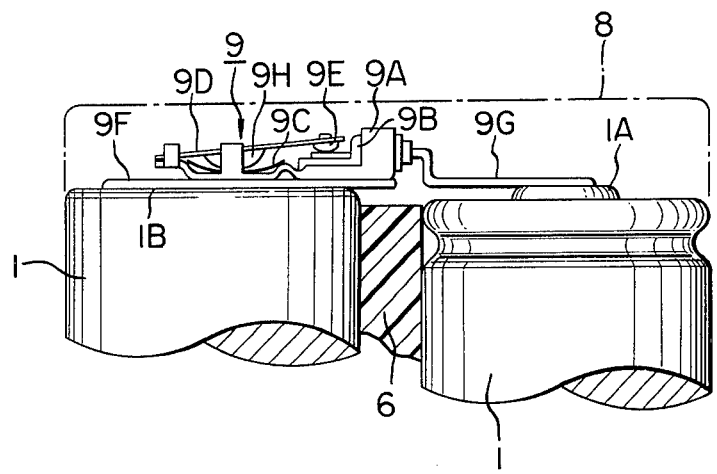
FIG. 4 is a side elevational view of the major part shown in FIG. 3.

FIGS. 2, 3, and 4 show a power source unit embodying the present invention. The numerals and symbols of 1, 9, 10, $a$ and $b$ in the drawings correspond with like numerals and symbols in FIG. 1.

In FIGS. 2, 3 and 4, the two rows of batteries $a$ and $b$ comprising a plurality of nickel-cadmium batteries connected in series are separated with an insulating separator 6. An insulating plastic cover 7 covers an outer surface of the battery rows $a$ and $b$, and houses the battery rows $a$ and $b$ and a thermal responsive switch 9 having such a structure as described later to form an integral unit. As shown in FIG. 2, the front end of the battery rows $a$ and $b$ is covered with an insulating front plate 2. In the front plate 2, are provided plug holes 3 and 4; and at the inner side of the front plate 2 is provided a socket terminal 5. The socket terminal 5 is connected to a terminal of a battery with a connecting means (not shown). When a plug (not shown) is inserted into the plug holes 3 and 4, the plug is contacted with the socket terminal 5 to permit discharging or charging via the plug and socket terminal. At the end face of the battery rows a and b opposite to the front plate 2 are provided the thermal responsive switch 9 and the diode 10 are covered with an insulating rear cover casing 8, as shown in FIG. 4 (in FIG. 4, the diode 10 is eliminated for clear illustration of the drawings).

The thermal responsive switch 9 comprises an electrically conductive base member 9A, insulating member 9B, heat sensitive plate 9C, resilient and electrically conductive switch operating plate 9D, contact 9E, (−) side mounting plate 9F and (+) side mounting plate 9G. The (−) side mounting plate 9F and the (+) side mounting plate 9G are made of a metal plate having high thermal conductivity and low electrical resistance. The (+) side mounting plate 9G is connected to the (+) terminal part 1A of batteries 1 located at the left end of the battery row b shown in FIG. 1, and at the same time passes through the insulating member 9B to be in contact with the contact 9E. On the other hand, the (−) side mounting plate 9F is connected to the (−) terminal portion 1B of batteries 1 located at the left end of the battery row a in FIG. 1. The base member 9A is attached to the (−) side mounting plate 9F. One end of the switch operating plate 9D is provided with a contact 9E, the other end of the switch operating plate 9D is attached to the base member 9A, and the intermediate portion of the switch operating plate 9D is provided with a recess 9H which is projected toward the base member 9A. The heat sensitive plate 9C is located between the base member 9A and the recess 9H of the switch operating plate 9D. And the heat sensitive plate 9C is arranged in such a manner that it keeps the switch operating plate 9D in a condition shown in FIG. 4 to maintain an electrical connection between the contact 9E and the (+) side mounting plate 9G when the temperature of the batteries 1 is below a predetermined level, and when the temperature of the batteries 1 is increased to over the level, it is deformed by heat to push up the recess 9H of the switch operating plate 9D, releasing the contact between the contact 9E and the (+) side mounting plate 9G. Thus, in the thermal responsive switch 9 an electrical path is formed from the (+) side mounting plate 9G to the (−) side mounting plate 9F via the contact 9E, the switch operating plate 9D and the base member 9A. And the diode 10 is connected in such a manner that, as shown in FIG. 3, its anode terminal is attached to the (+) side mounting plate 9G and its cathod terminal is attached to the (−) side mounting plate 9F.

When the temperature of either batteries of the battery row a and b is increased, the heat generated in the batteries 1 is transmitted to the heat sensitive plate 9C immediately through either the (+) side mounting plate 9G or the (−) side mounting plate 9F. And as the temperature of batteries 1 is further increased, the temperature of the heat sensitive plate 9C exceeds a predetermined level, the switch operating plate 9D is pushed up due to deformation of the heat sensitive plate 9C as described above and the contact 9E is released from contact with the (+) side mounting plate 9G. That is, the thermal responsive switch 9 is turned off. Thus, when the thermal responsive switch 9 is turned off, as described above, a charging current is completely interrupted at the time of charging the power source unit, and similarly the discharging current is interrupted with the protective current flowing via the diode 10 at the time of discharging the power source unit. And when the temperature of the heat sensitive plate 9C is below the predetermined level due to decrease in the temperature of the batteries 1, the switch operating plate 9D is returned to the state shown in FIG. 4 and the contact 9E is again in contact with the (+) side mounting plate 9G. That is, the thermal responsive switch 9 is again turned on.

As previously described, the power source unit of the present invention can be rapidly charged or discharged with a high current. When an extremely large current flows in the batteries, causing an increase in temperature of the batteries 1, a charging or discharging current is automatically limited to provide a decrease in temperature of batteries 1, and thus failure of batteries, deterioration of battery performance and reduction in the life of batteries due to temperature rise can be prevented.

According to this invention, since the batteries 1, the insulating front plate 2, the socket terminal 5, the separator 6, the rear cover casing 8, the thermal responsive switch 9 and the diode 10 are covered with an insulating plastic cover 7, for example, a thermal shrinkable plastic cover to form an integral unit, unwanted shortcircuit never occurs in batteries 1. And the cover 7 will satisfactorily function by covering only the rear cover casing 8 including at least the thermal responsive switch 9.

In the above described embodiment, only the diode 10 is connected to the thermal responsive switch 9 in parallel, but a resistance may be connected in series to the diode 10. And an electronic thermal responsive switch may be used in place of the mechanical thermal responsive switch. It may also be possible to use the other tyype of circuit element whose forward current-/voltage characteristic and backward current/voltage characteristic are different.

What is claimed is:

1. A power source unit comprising battery rows consisting of a plurality of rapidly chargeable and dischargeable batteries having low internal resistance connected in series, disposed in parallel rows with separators in between, and packed into a unit, characterized in that the power source unit incorporates a thermal responsive device for stopping an electric current flowing in the batteries by means of changes in the state of the thermal responsive device when temperature in the batteries in the power source unit is increased during charging of the batteries, and for restricting the current to a predetermined low level of current by means of changes in the state of the thermal responsive device when temperature in the batteries in the power source unit is increased during discharging of the batteries.

2. A power source unit as set forth in claim 1 wherein the thermal responsive device is connected directly with the battery circuit.

3. A power source unit as set forth in claim 2 characterized in that the thermal responsive device includes a thermal responsive circuit element.

4. A power source unit as set forth in claim 3 characterized in that the thermal responsive circuit element is a thermal responsive switch.

5. A power source unit as set forth in claim 4 characterized in that the thermal responsive switch comprises an electrically conductive positive side mounting plate having a high thermal conductivity connected to the positive terminal of a battery, an electrically conductive negative side mounting plate having a high thermal conductivity connected to the negative terminal of another battery adjacent to the above-mentioned battery, a switch operating plate disposed between the positive side mounting plate and the negative side mounting plate for directly controlling an ohmic connection between the said mounting plates, and a heat sensitive plate which is deformed by temperature change to operate and control the switch operating plate, characterized in that, when temperature in the batteries exceeds a predetermined level, the switch operating plate is operated to disconnect an ohmic connection between the mounting plates.

6. A power source unit as set forth in claim 2 characterized in that the thermal responsive device has a thermal responsive circuit element and a non-linear circuit element which is electrically connected in parallel with the thermal responsive circuit element and whose forward current/voltage characteristic and backward current/voltage characteristic are different.

7. A power source unit as set forth in claim 6 characterized in that the anode terminal of the non-linear circuit element is a diode whose anode terminal is connected with the positive terminal portion of a battery and whose cathode terminal is connected with the negative terminal portion of another battery adjacent to the above-mentioned battery.

8. A power source unit as set forth in claim 1 characterized in that the thermal responsive device is covered with an insulating cover casing.

9. A power source unit as set forth in claim 1 characterized in that a plurality of the batteries and the thermal responsive device are covered with an insulating plastic cover to form an integal unit.

* * * * *